UNITED STATES PATENT OFFICE.

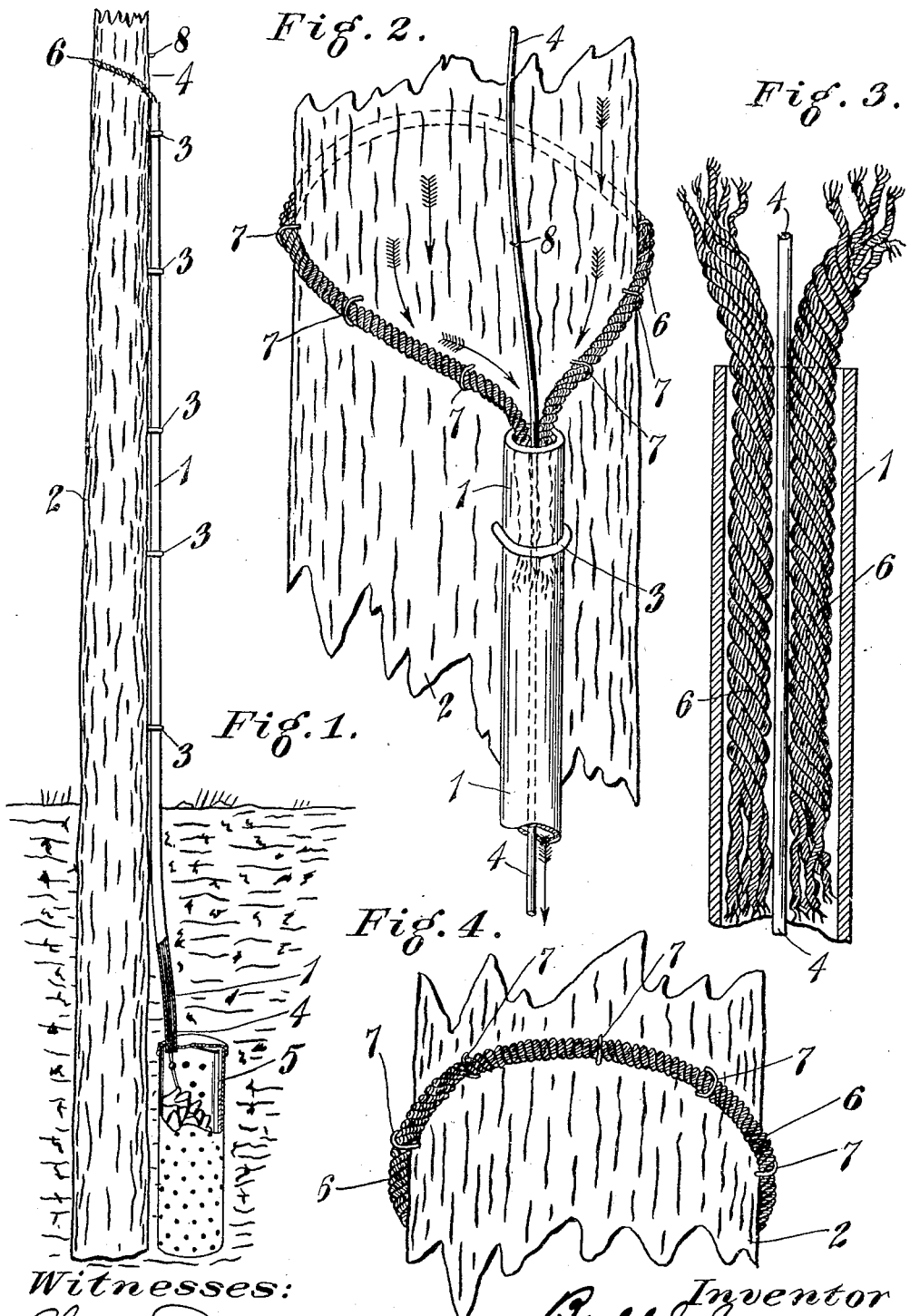

BUDD J. JONES, OF CINCINNATI, OHIO.

IRRIGATING DEVICE FOR ELECTRICAL GROUND CONNECTIONS.

No. 921,844.     Specification of Letters Patent.     Patented May 18, 1909.

Application filed February 10, 1908. Serial No. 415,074.

*To all whom it may concern:*

Be it known that I, BUDD J. JONES, a citizen of the United States, residing at Cincinnati, in the county of Hamilton and State of Ohio, have invented certain new and useful Improvements in Irrigating Devices for Electrical Ground Connections, of which the following is a specification.

My invention relates to electrical installation apparatus, and the object is to maintain the dampness of the ground lying immediately adjacent to a ground connecting plate, such as is used for connecting a ground wire in pole line construction.

My invention consists in a rope, or article of similar character, placed around the pole, in combination with a conduit through which the ground connecting conductor extends, this rope, or article of similar character, leading into the conduit.

In the drawing, which serves to illustrate my invention: Figure 1 is a side elevation of part of a pole provided with my invention and illustrating how the conduit with the conductor inside of it extends into the ground to connect to the ground plate. Fig. 2 is a perspective view of a pole on an enlarged scale, showing how the rope is placed around the pole and how it extends into the conduit. Fig. 3 is a longitudinal sectional view of the conduit with the conductor inside of it, and with the ends of the rope extending into the conduit, the conductor and ends of the rope being shown in elevation. Fig. 4 is a perspective view of the side of the pole opposite to that illustrated in Fig. 2.

The form of ground plate illustrated in Fig. 1 of the drawing is that illustrated and described in a former patent issued to me, but the part of the installation with which the present invention is concerned does not involve the use of any particular form of ground plate, but includes as an essential feature a conduit 1 extending parallel with the pole 2 and secured thereto by means of fastenings 3. This conduit 1 extends up the pole to a height sufficient that it may form a protection to the conductor 4 which runs through it, against damage, intentional or otherwise, and this conduit extends downward into the ground and surrounds the conductor 4 as far as the ground plate 5, where the conductor 4 is electrically connected to the ground plate 5. As will be noted, the ground plate 5 is perforated and its general construction is such that the moisture from the ground may permeate through its structure, the materials of which are such that a most efficient electrical connection is made with the adjacent ground, the efficiency of which connection is increased by the dampness of the ground and of the materials of which the ground plate is constructed. This observation will apply equally to any well known form of ground plate, but the ground plate herein illustrated, being portable and self-contained, has advantages which, however, need not be described herein, since it forms no essential part of the invention.

Whatever kind of ground plate is used, it will be more efficient if the ground is maintained in a damp condition, than if the ground be allowed to dry out around it. In places where the ground is dry, owing to the scarcity of rain fall, or to the nature of the ground, it is desirable that such rain fall as there is may be utilized to the greatest advantage in maintaining the ground in damp condition around the ground plates. For this purpose I add to the function of the conduit 1, which function consists in forming a protection for the conductor 4, the function of conducting water to the ground plate from the surface of the pole 2, by placing around the pole, near the upper end of the conduit 1, a rope 6 which has its ends extending into the upper part of the conduit 1. This rope 6 is made to tightly embrace the pole 2 by securing it with staples 7 so that water running down the surface of the pole during rain fall, will be obstructed by this rope and conducted toward the conduit 1. The flow of the water into the conduit 1 from the obstructing rope is facilitated by passing the rope around the pole obliquely in a direction inclined to the axis of the pole. In Fig. 2, the arrows indicate the direction of the flow of the water when thus conducted, and it will be noted that the end portions of the rope, coming together into the conduit, form the most efficient means of entrance of the water into the conduit. The rope thus placed around the pole takes the form of a girdle or cincture. It will be readily understood that any article similar to a rope in form and structure may be substituted for the rope, such as insulated wire or other material which may be found convenient to those engaged in installing the pole line. However, the funicular character of the article, whether it be rope, wire or other article, allows it to be passed around the pole and made to conform closely to the surface thereof while its two ends both extending into the conduit 1 constitute it a most efficient device for the special purpose of obstructing and diverting the flow of the water down the surface of the pole to conduct the water into the conduit.

I prefer to use rope, as illustrated, and in order that it may be well preserved against the action of the weather, it should be tarred or otherwise treated with an efficient preservative material. The conduit 1 may be of any of the well known materials used for conduits for electrical conductors, and should open freely at its lower end to allow the escape of water which it conducts, so that the water may permeate freely into the ground around the ground plate and through the materials composing the ground plate. The ends of the rope or other funicular body used to form the girdle or cincture around the pole, should extend down into the conduit a sufficient distance to insure against their being withdrawn from the conduit.

In installing my invention in connection with the usual ground connections, it will be found that a rope or similar article of about one-half inch diameter will be sufficiently large, and it should extend down into the conduit about four or five inches. The conductor 4, as is usual, may be secured to the pole by staples 8, as shown.

While I have shown and specifically described certain details of construction, I do not wish to be understood as limiting myself to them, but

What I claim as new and desire to secure by Letters Patent is:

1. In an irrigating device for electrical ground connections, the combination with a pole and an electrical ground connecting conductor thereon, of a conduit through which the conductor extends into the ground, and a funicular cincture surrounding the pole, independent of the ground conductor, and extending obliquely to the axis of the pole with both of its ends extending into the conduit, substantially as and for the purposes specified.

2. In an irrigating device for electrical ground connections, the combination with a pole, an electrical ground connecting conductor on the pole, and a ground plate to which the ground connecting conductor is connected of a conduit, through which the conductor extends to the ground plate, adapted to conduct water to the ground adjacent to the ground plate, and a funicular cincture surrounding the pole independent of the ground connecting conductor and extending obliquely to the axis of the pole, with both of its ends extending into the conduit, substantially as and for the purposes set forth.

BUDD J. JONES.

Witnesses:
JAMES N. RAMSEY,
STELLA RUTZ.